(12) United States Patent
Krizenawski

(10) Patent No.: US 8,393,848 B1
(45) Date of Patent: Mar. 12, 2013

(54) MULTIPLE BALE PICK-UP SWEEP

(76) Inventor: George Krizenawski, Bozeman, MT (US)

( * ) Notice: Subject to any disclaimer, the term of this patent is extended or adjusted under 35 U.S.C. 154(b) by 581 days.

(21) Appl. No.: 12/660,341

(22) Filed: Feb. 24, 2010

Related U.S. Application Data

(60) Provisional application No. 61/208,385, filed on Feb. 24, 2009.

(51) Int. Cl.
*E02F 3/413* (2006.01)

(52) U.S. Cl. ....... 414/722; 414/24.5; 414/111; 414/607; 414/608; 414/721

(58) Field of Classification Search .................. 414/24.5, 414/111, 607, 608, 720, 721, 722
See application file for complete search history.

(56) References Cited

U.S. PATENT DOCUMENTS

| | | |
|---|---|---|
| 239,194 A | 3/1881 | Reynolds |
| 2,817,449 A | 12/1957 | Meyer, Jr. et al. |
| 3,643,821 A | 2/1972 | Viel |
| 3,876,090 A | 4/1975 | Holland |
| 3,908,844 A | 9/1975 | Duffield |
| 3,957,167 A | 5/1976 | Jacobson et al. |
| 4,128,179 A | 12/1978 | Gilbert |
| 4,275,985 A | 6/1981 | Schremmer |
| 4,537,549 A | 8/1985 | Knels |
| 4,634,336 A | 1/1987 | Pearce |
| 5,071,311 A | 12/1991 | Foster et al. |
| 5,984,606 A | 11/1999 | Meeks |
| 6,663,337 B2 | 12/2003 | Westendorf et al. |
| 6,718,662 B1 | 4/2004 | Schaff |
| 7,182,568 B2 | 2/2007 | McGinnes |
| 7,226,268 B2 | 6/2007 | Gustafson et al. |
| 7,641,436 B2 | 1/2010 | Wippel et al. |
| 2006/0289180 A1 | 12/2006 | Wentling |
| 2009/0129895 A1 | 5/2009 | Burenga |

*Primary Examiner* — Scott Lowe
(74) *Attorney, Agent, or Firm* — Richard C. Conover

(57) ABSTRACT

A bale sweep having a plate assembly mounted on a rearward side of an upright frame for attaching to a skid steer loader. The bale sweep includes a step mounted to a forward side of the upright frame for easy entry into the skid steer loader. A plurality of spaced apart parallel tines are secured to the upright frame and extend in a forward direction. A brace rod, provided for each tine, has an end secured to an upper portion of the upright frame and extends forwardly and downwardly toward a brace connector secured adjacent a forward end of each tine. The brace connector includes a faceplate facing the brace rod. The faceplate having an opening for slidably receiving a forward end of the brace rod. A tension spring is connected between the brace rod and face plate allowing each tine to move upwardly independent of one another.

1 Claim, 8 Drawing Sheets

MULTIPLE BALE PICK-UP SWEEP

This application claims the benefit of provisional application Ser. No. 61/208,385 filed Feb. 24, 2009.

BACKGROUND OF INVENTION

The present invention relates to a bale sweep for picking up and transporting multiple bales and is intended as a bale lifting device for attachment to a skid steer loader provided with a Universal Skid Steer Quick attach.

When farmers bale agricultural products such as hay and alfalfa, a baler is used to pick up the product and bale the product in a multitude of forms. Most generally, the bales are either large rectangular bales, large round cylindrical bales or small rectangular bales. The present invention is used with the small rectangular bales. The present invention is also used with a skid steer loader, often called a Bobcat® having a Universal Skid Steer Quick Attach. The skid steer loader has the advantage of being small in size and has versatile usages. Generally, skid steer loader loaders have a bucket attachment on the front which can be used to scoop up material and lift the material to a higher height. The present invention replaces the bucket on a skid steer loader loader and can be used for sweeping multiple bales lying on the ground and also for lifting the bales to a position where they can be loaded in a stack or on the bed of a transport truck.

Small bale sweeps are known such as shown in U.S. Pat. No. 2,817,449. The present invention is an improvement over the bale sweep shown in this patent by having a bale sweep specially adapted for use with skid steer loaders. The bale sweep according to the present invention includes a mounting plate for attachment with a Universal Skid Steer Quick Attach mounted to a skid steer loader and also includes a step for easy entry into the skid steer loader.

SUMMARY OF INVENTION

A bale sweep for receiving multiple bales of an agricultural product which is attached to a skid steer loader provided with a Universal Skid Steer Quick Attach. The bale sweep includes a generally rectangular upright frame. A plurality of spaced apart parallel tines are secured to a lower frame member and extend in a forward direction. A forward end of each tine is provided with a guide tooth that extends forwardly and upwardly. A brace rod is provided for each tine. The brace rod having an end secured to an upper portion of the frame and extends forwardly and downwardly toward a tine. A shaft is secured to a distal end of the brace rod and extends in a forward direction and is aligned with a longitudinal axis of the brace rod. A brace connector is secured to each tine at a forward end of each tine. The brace connector is provided with a faceplate facing the brace rod. The faceplate includes an opening for slidably receiving the shaft and a resilient means is provided which extends between the faceplate and an exposed forward end of the brace rod. The frame of the bale sweep is further provided with a support member to which a plate assembly is secured to a rearward side of the support member. The plate assembly is adapted to connect to a Universal Skid Steer Quick Attach mounted to a skid steer loader. A step is mounted to a forward side of the support member which allows an operator to easily enter the cab of a skid steer loader.

BRIEF DESCRIPTION OF THE DRAWINGS

In order that the invention may be clearly understood and readily carried into effect, a preferred embodiment of the invention will now be described, by way of example only, with reference to the accompanying drawings wherein.

DESCRIPTION OF A PREFERRED EMBODIMENT

Figure 1:
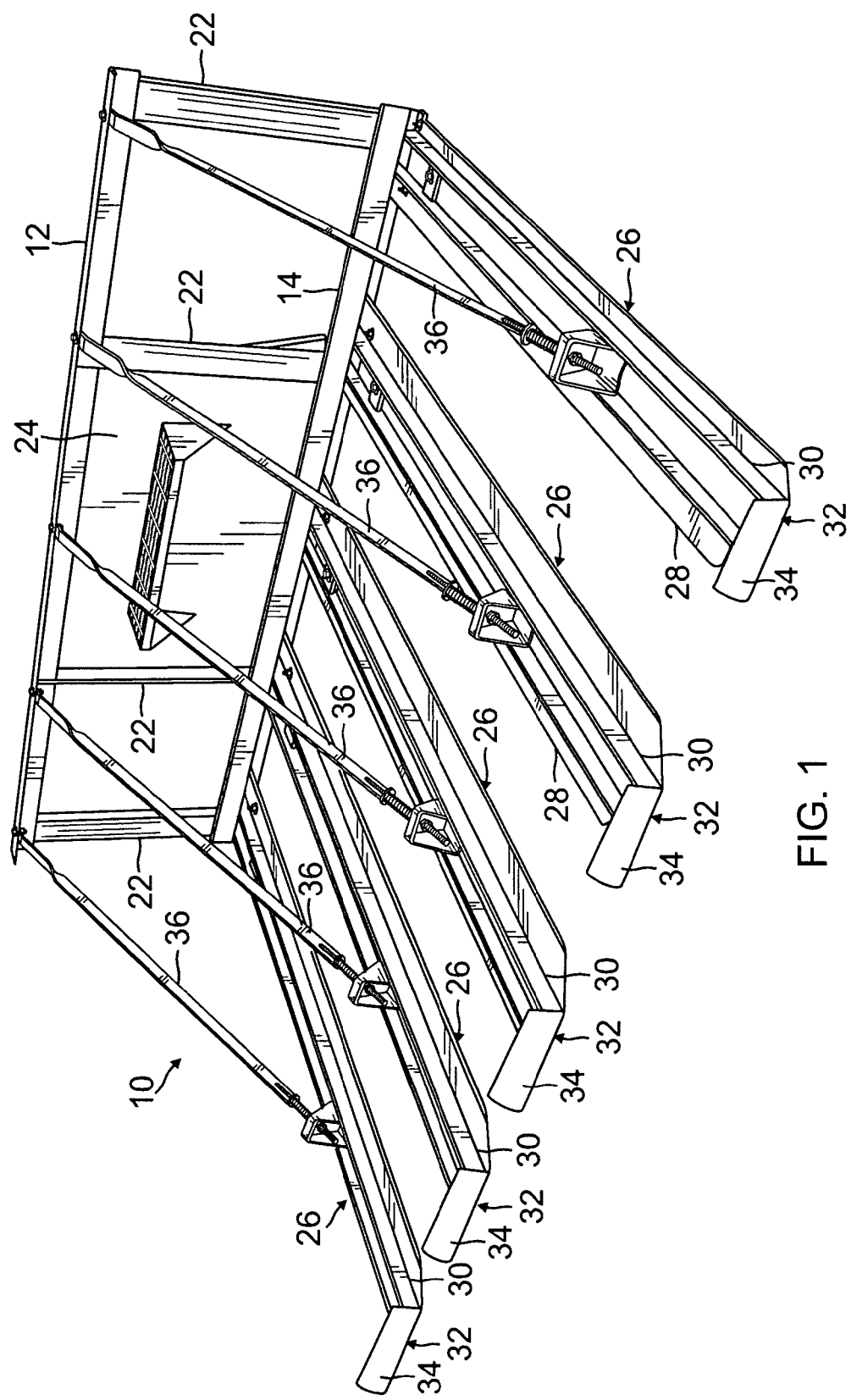
FIG. 1 is a perspective view of a bale sweep according to the present invention.
Figure 2:
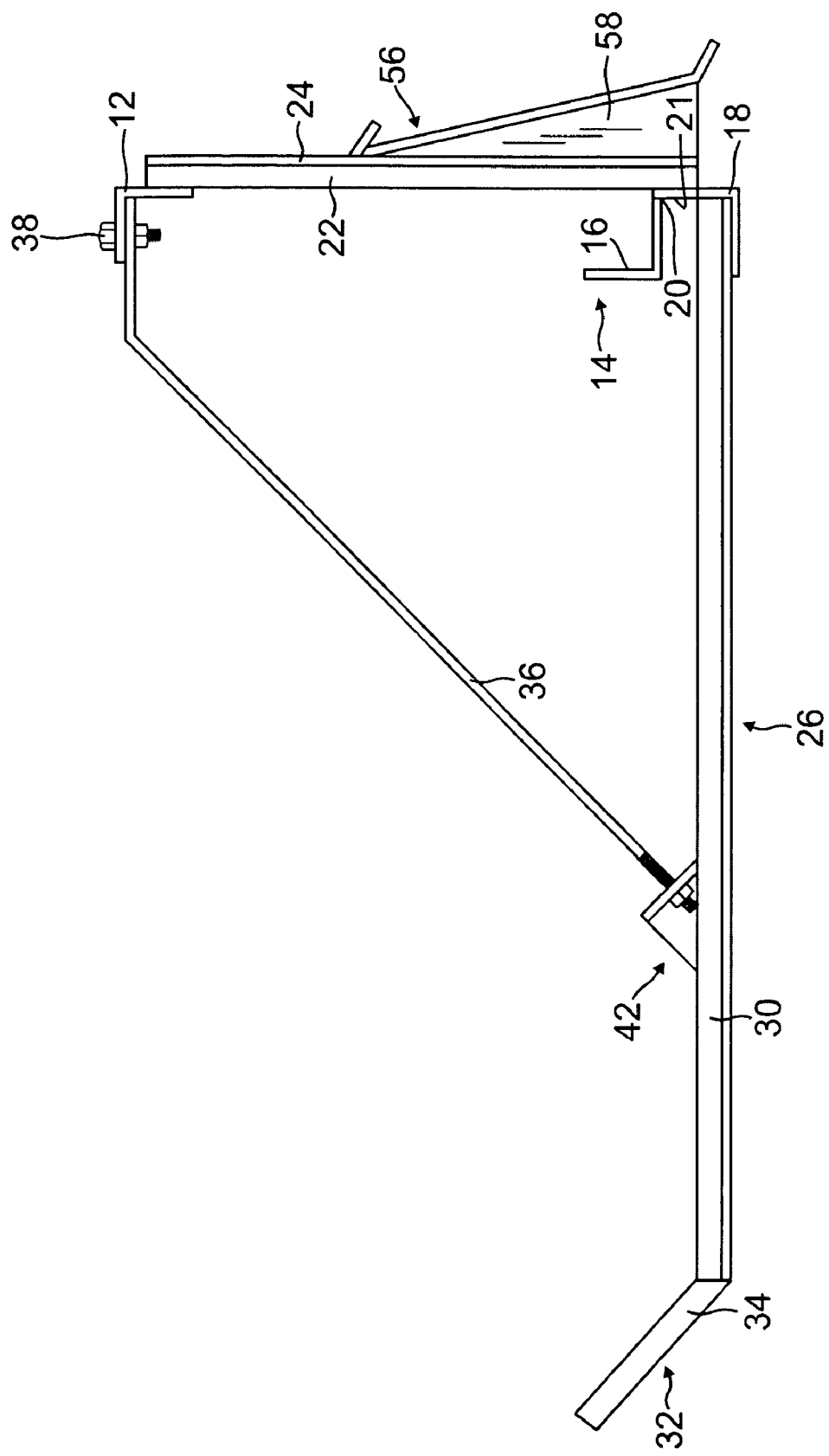
FIG. 2 is a schematic elevational view of the bale sweep shown in FIG. 1.
Figure 3:
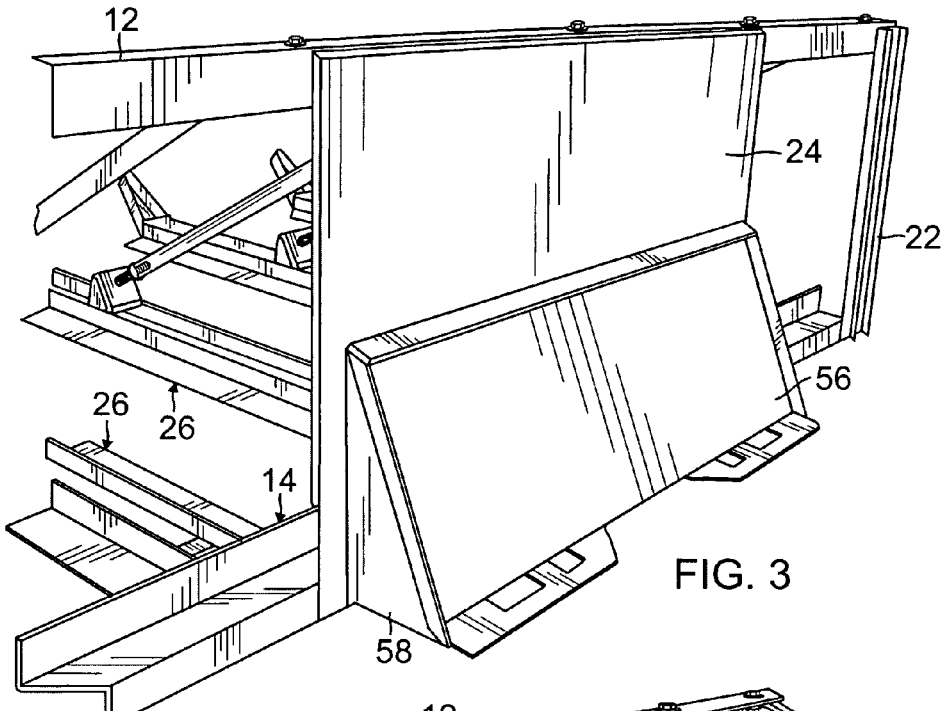
FIG. 3 is a partial perspective rear view of the bale sweep shown in FIG. 1.

A bale sweep 10 is shown in FIG. 1. The bale sweep 10 includes a frame having an upper angle iron beam 12 as shown in FIGS. 1 and 2 and a lower beam 14 which includes two angle iron members 16 and 18 which are welded together along one edge at 20 leaving a "U" shaped opening 21 as shown in FIG. 2. The upper beam 12 and lower beam 14 are arranged in spaced apart parallel relation and upright "U" channel members 22 extend between the upper beam and lower beam and are welded at their respective ends thereto. A steel plate 24, which covers the space between the upper beam 12 and the lower beam 14 and also between the inner two "U" channels 22, is welded to the upper beam 12 and the lower beam 14 on the rearward side as shown in FIGS. 1, 2 and 3.

Figure 4:
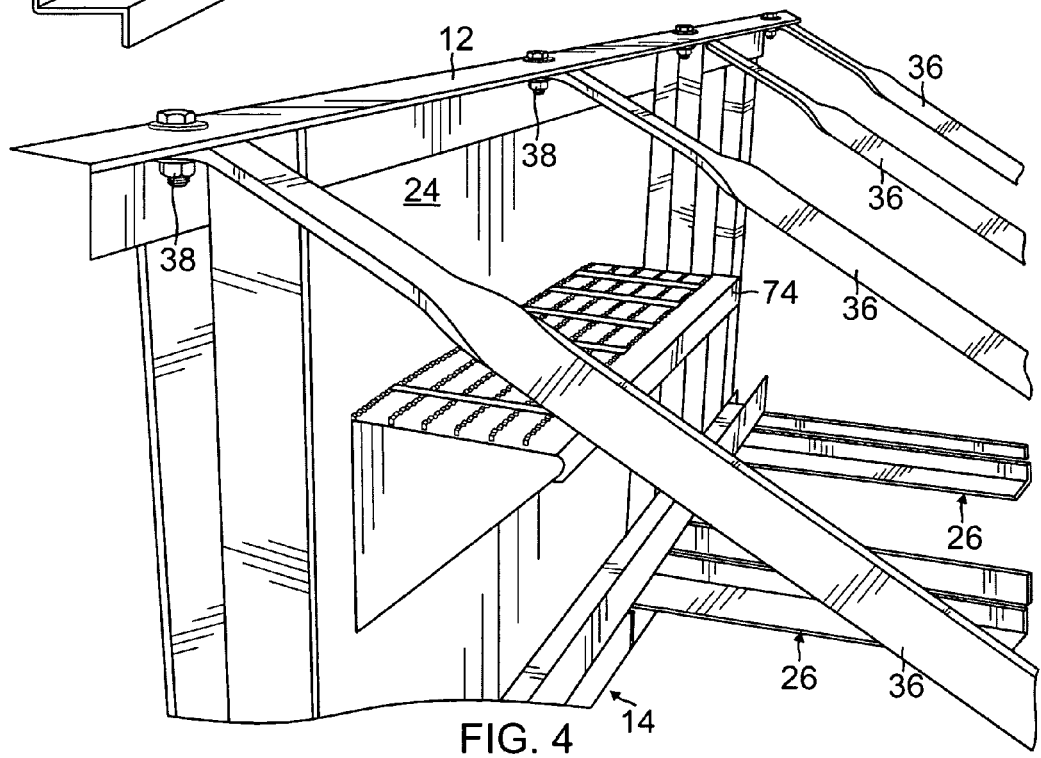
FIG. 4 is a detail perspective front view of the bale sweep shown in FIG. 1 showing a step used with the present invention.

A plurality of forwardly extending tines 26 are secured as by welding in the opening 21 of the lower beam 14 as shown in FIGS. 1, 2 and 4. Each of the tines 26 include a pair of spaced apart and parallel arranged angle irons 28 and 30. The angle irons 28 and 30 are arranged with the horizontal flanges facing outwardly and the vertical flanges arranged facing one another as shown in FIG. 1. The forward end of the angle irons 28 and 30 are provided with a guide tooth generally indicated at 32 which includes a pair of converging sidewalls 34 which extend forwardly and upwardly. A bottom wall (not shown) covers the opening between the converging sidewalls 34.

A forwardly and downwardly sloping brace rod 36 has one end bolted to the upper beam 12 as shown in FIGS. 1 and 2 with bolts 38. An elongated threaded bolt 40 is welded to the distal end of the brace rod 36 as shown in FIGS. 5 and 6.

Figure 5:
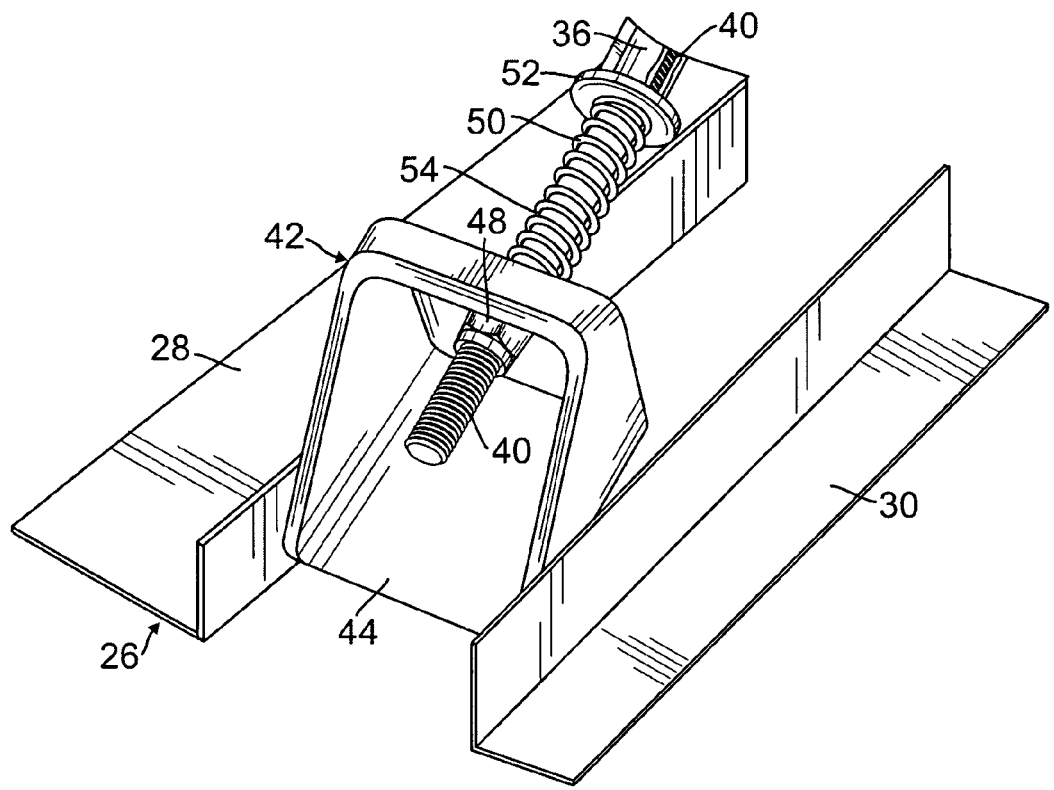
FIG. 5 is a detail perspective front view of a connector box used with the present invention.
Figure 6:
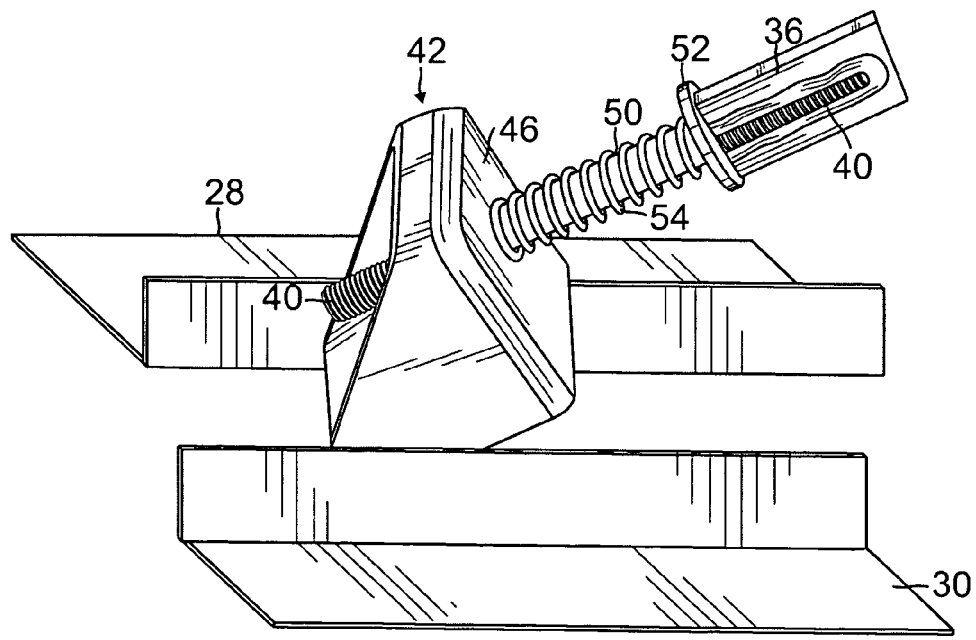
FIG. 6 is a detail perspective side view of the connector box shown in FIG. 5.

A connector box 42 includes a bottom plate 44 which is welded between the angle irons 28 and 30 as shown in FIG. 5. The connector box 42 also includes a plate 46 which is arranged to face the brace rod 36 as shown in FIG. 6. The plate 46 includes an opening through which the elongated bolt 40 slidably extends. A nut 48 is threaded onto the bolt 40 to secure the bolt 40 within the opening provided in plate 46 as shown in FIG. 5. A sleeve 50 is provided on the bolt 40 between the plate 46 and the brace rod 36 as shown in FIG. 6. A washer 52 is secured to an end of the rod 36 as shown in FIGS. 5 and 6 and a tension spring 54 is arranged over the sleeve 50 between the plate 46 and the washer 52. With this arrangement, individual tines 26 are allowed to move upwardly against the resilient force of springs 54 when the tines 26 are pushed over uneven ground.

Figure 7:
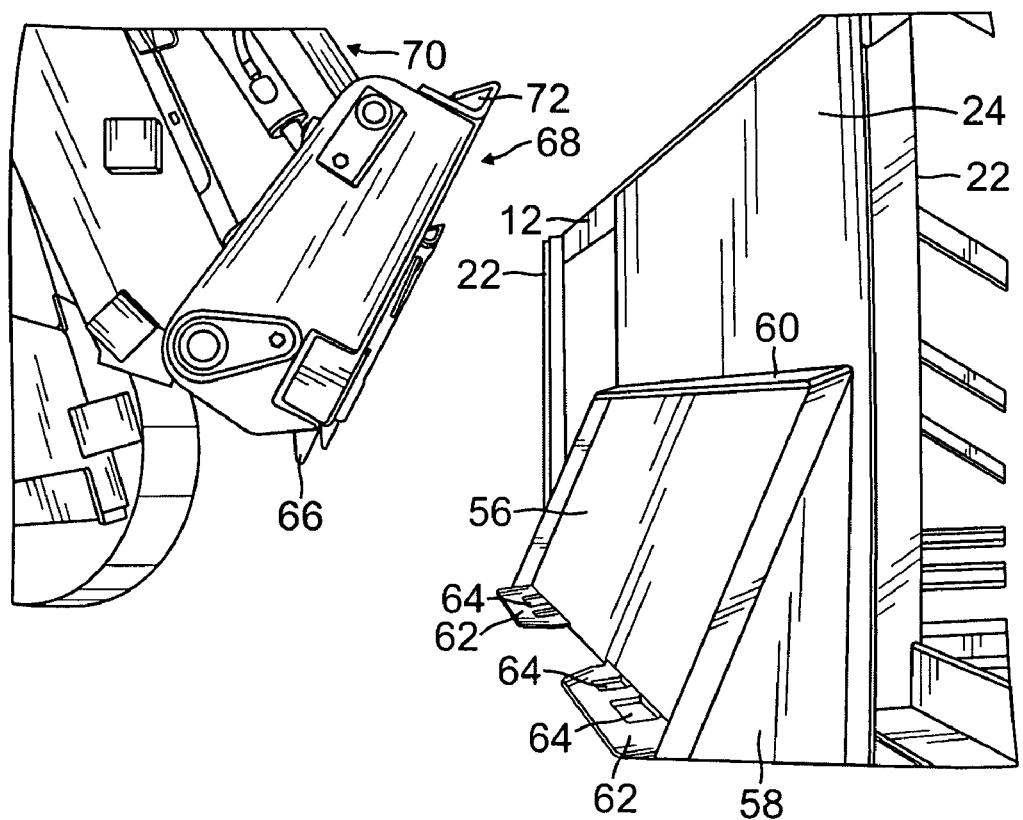
FIG. 7 is a perspective elevational view showing a skid steer loader prior to attachment with a bale sweep shown in FIG. 1.
Figure 8:
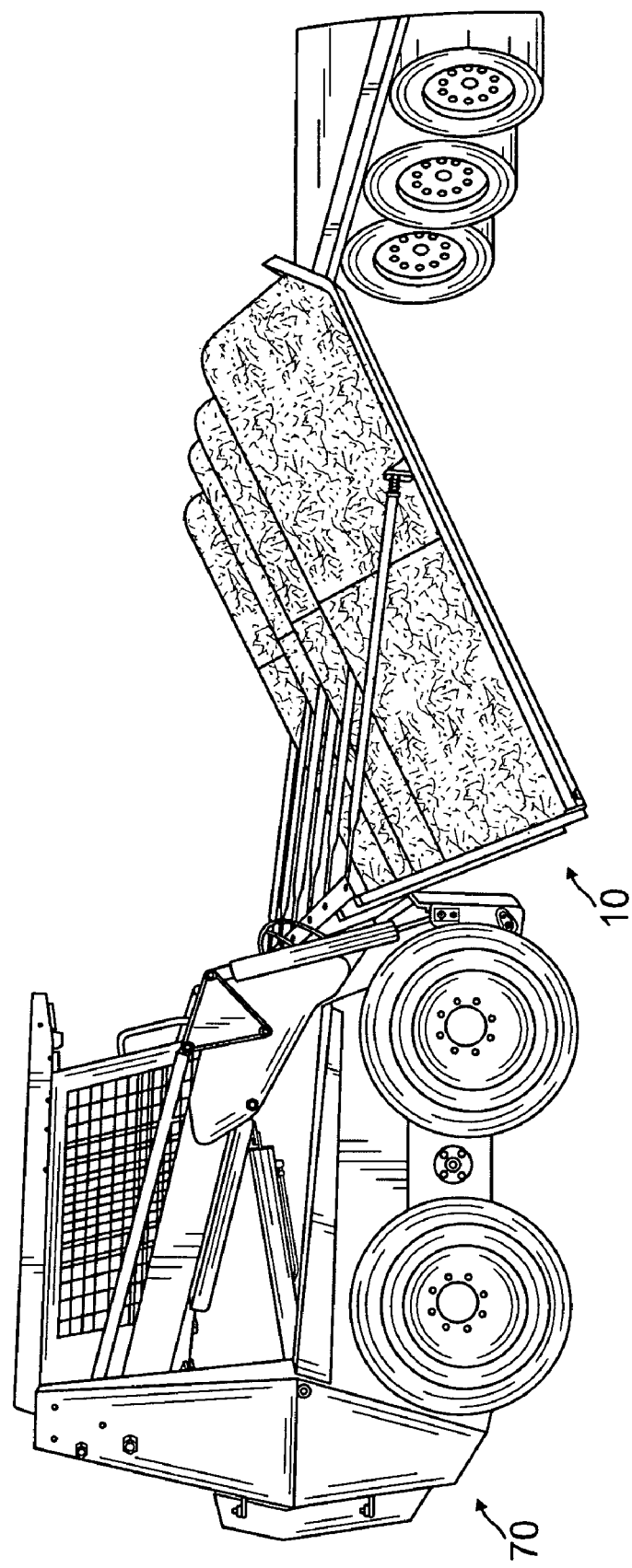
FIG. 8 is a perspective elevational view showing the bale sweep shown in FIG. 1 attached to a skid steer loader.

A conventional skid steer loader adapter plate 56 is welded to the rearward side of plate 24 as shown in FIG. 3. At each end of the skid steer loader plate 56, a steel gusset 58 is welded to maintain the skid steer loader plate 56 at an angle with the steel plate 24 as shown in FIGS. 2 and 3. The conventional skid steer loader plate 56 includes a downwardly extending lip 60 and an outwardly extending plate 62 as shown in FIG. 7. The outwardly extending plate 62 has a series of openings 64 for receiving engagement teeth 66 provided on a Universal Skid Steer Quick Attach 68 of a conventional skid steer loader 70. The Universal Skid Steer Quick Attach 68 of the skid steer loader 70 also includes an upwardly extending lip 72 which is received by the downwardly extending lip 60 of the skid steer loader adapter plate 56. FIG. 8 shows a bale sweep 10 according to the present invention attached to the front of a skid steer loader 70 and carrying multiple bales.

On the forward side of the plate 24 is mounted a step 74 as shown in FIG. 4. When an operator enters the cab of a skid steer loader, entry must be made from the forward end of the skid steer loader. The step allows a user to easily enter the cab of the skid steer loader 70.

Figure 9:
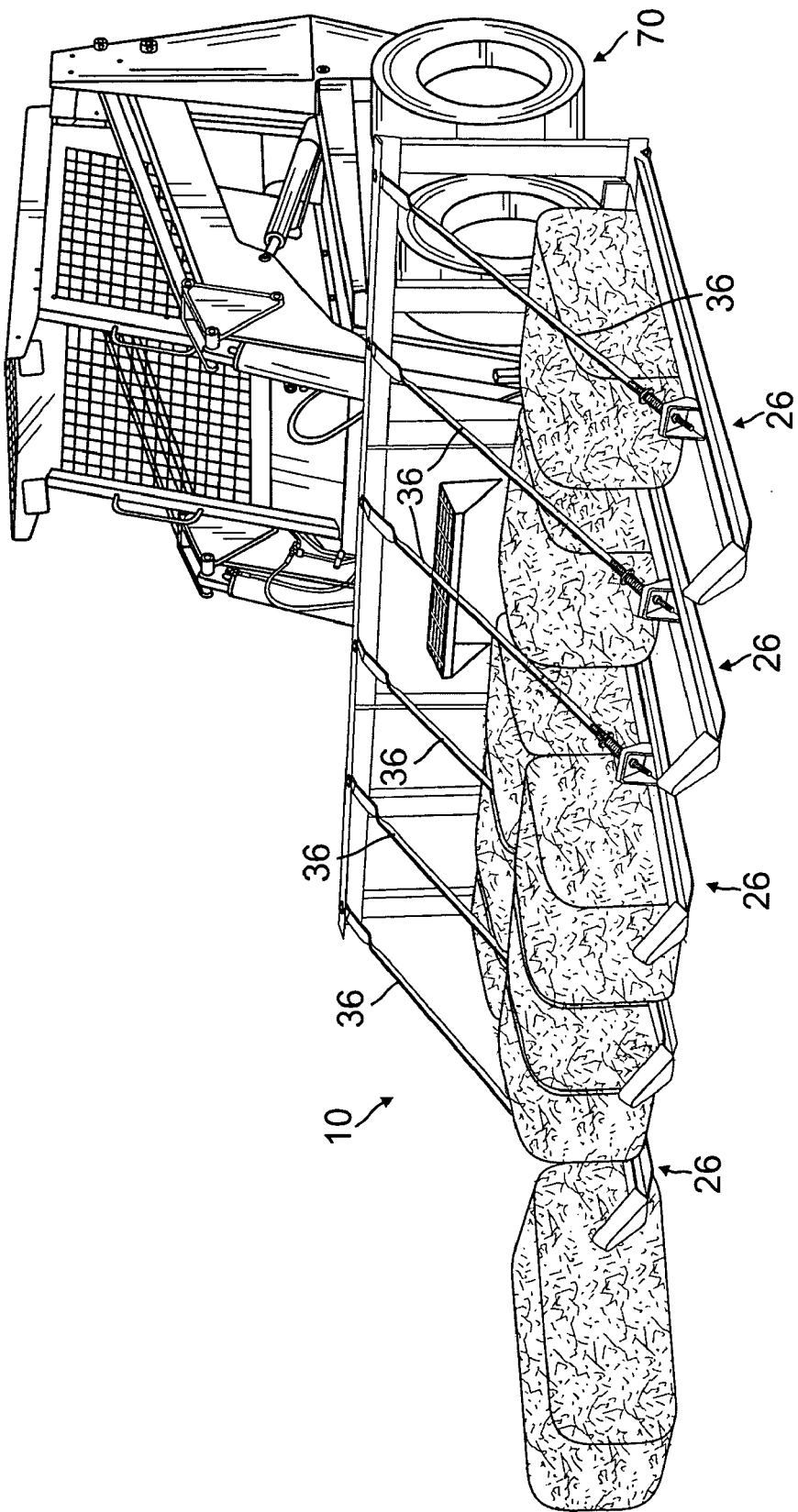
FIG. 9 is a perspective view showing the bale sweep shown in FIG. 1 being used to pick up bales.
Figure 10:
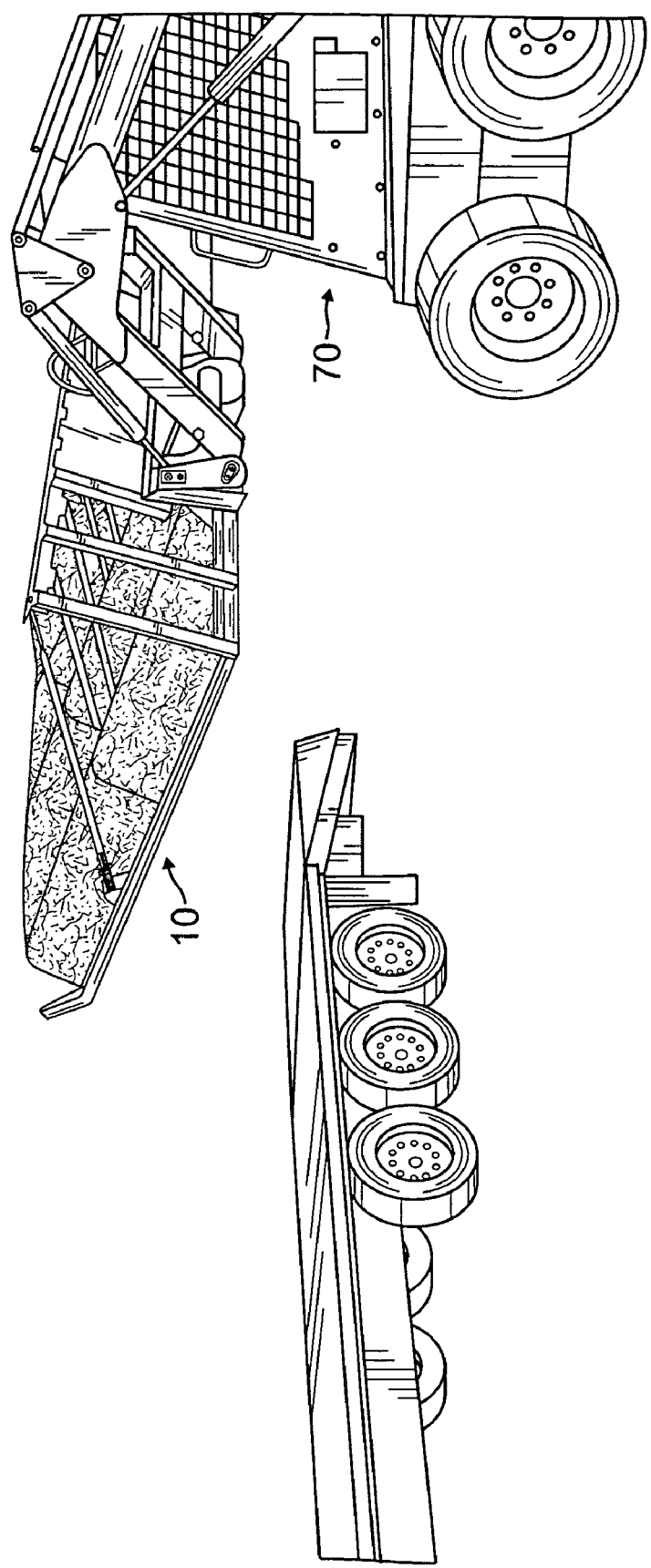
FIG. 10 is a perspective view of the bale sweep shown in FIG. 1 being used to transport multiple bales.

As shown in FIG. 9, the bale sweep 10 can be used for picking up multiple bales in the field by sweeping up the bales with the tines 26. Once the bales have been completely loaded in the sweep, the bales can then be either transported to a stack or can be transported to a hauling vehicle as shown in FIG. 10.

While the fundamental novel features of the invention have been shown and described, it should be understood that various substitutions, modifications, and variations may be made by those skilled in the arts, without departing from the spirit or scope of the invention. Accordingly, all such modifications or variations are included in the scope of the invention as defined by the following claims:

I claim:

1. A bale sweep for receiving multiple bales of an agricultural product that attaches to a skid steer loader provided with a Universal Skid Steer Quick Attach comprising:
    a generally rectangular upright frame having an upper beam and a lower beam together with a pair of spaced apart side members;
    the spaced apart side members positioned at opposite lateral ends of the upper beam and lower beam and each end of the spaced apart side members secured to the upper beam and lower beam;
    a support member secured to the upper beam and lower beam intermediate the spaced apart side members;
    a step mounted to a forward side of the support member;
    a plate assembly secured to a rearward side of the support member wherein the plate assembly is adapted to connect to the Universal Skid Steer Quick Attach;
    a plurality of spaced apart parallel tines secured to the lower beam and extending in a forward direction;
    the tines each including a pair of spaced apart angle iron members having horizontal flanges facing outwardly and vertical flanges arranged facing one another;
    a forward end of the spaced apart angle iron members of each tine provided with a guide tooth which extends forwardly and upwardly;
    a forwardly extending and downwardly sloping brace rod provided for each tine;
    the brace rod having an end secured to the upper beam;
    a threaded bolt secured to a distal end of the brace rod and extending in a forward direction and aligned with a longitudinal axis of the brace rod;
    a brace connector secured to the spaced apart angle iron members of each tine at a forward end of each tine;
    the brace connector provided with a face plate facing the brace rod;
    the face plate including an opening for slidably receiving the threaded bolt; and
    a resilient means extending between the face plate and an exposed forward end of the brace rod.

\* \* \* \* \*